INVENTORS
THEODORE H. MAIMAN
RAYMOND H. HOSKINS
BERNARD H. SOFFER
RICARDO C. PASTOR
MARIA A. PEARSON
BY Elliott & Pastoriza
ATTORNEYS.

United States Patent Office 3,396,119
Patented Aug. 6, 1968

3,396,119
GREEN LUMINESCING PHOSPHOR FOR COLOR TELEVISION AND METHOD OF MAKING SAME
Theodore H. Maiman, Pacific Palisades, Raymond H. Hoskins, San Pedro, Bernard H. Soffer, Northridge, Ricardo C. Pastor, Manhattan Beach, and Maria A. Pearson, Inglewood, Calif., assignors to Union Carbide Corporation
Filed Mar. 22, 1965, Ser. No. 441,608
3 Claims. (Cl. 252—301.4)

ABSTRACT OF THE DISCLOSURE

A green luminescing phosphor composition is set forth together with a method of forming the same for use in color television. The composition consists essentially of magnesium spinel doped with divalent manganese ions and including an additive of vanadium for quenching the long-lived luminescent component of the phosphor so that it will be suitable for color television use. The method includes the step of dropping a powdered mixture after calcinating the same through an inverted burner operated with a reducing composition to form the magnesium spinel with the divalent manganese received in the spinel lattice.

---

Figure 1:
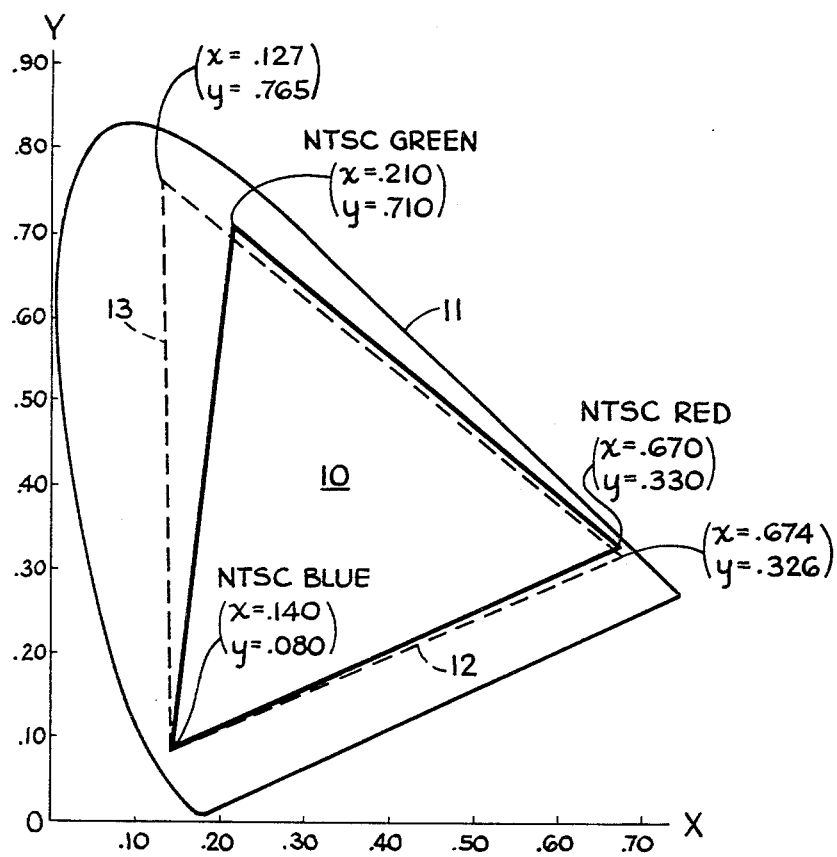

This invention relates generally to compositions of matter and more particularly to a novel green luminescing phosphor composition and method for making the same for use in color television tubes.

Conventional color television tubes are presently constructed with three luminescent phosphors for emitting, respectively, blue, green, and red light. These phosphors are formed in a matrix over the inside surface of the television tube, usually in the form of triplet dot groups, the three dots in each group being respectively responsive to three electron beams from an electron gun in the tube. A particular phosphor is caused to luminesce depending upon whether or not its associated electron beam is of sufficient intensity to activate the phosphor. This latter condition, in turn, is controlled by signal information received from the transmitted color television program.

The fidelity of color reproduction not only depends upon a true primary color being reproduced, such as the blue, green, or red, but also on the linearity of luminescent intensity with respect to variations in the incident electron beam strength.

The National Television Systems Committee (NTSC) has specified the standard primary colors of blue, green, and red by their chromaticity coordinates $(xy)$ on the standard CIE (Commissione Internationale de l'Eclairage) chromaticity diagram. However, there has not been available heretofore suitably bright and linear phosphors to completely meet the standards established.

In co-pending patent application Ser. No. 427,719, filed Jan. 25, 1965, now abandoned, and entitled Red Luminescing Phosphor for Color Television, there is described and claimed a new phosphor in the form of lanthanum oxide doped with europium ions. The chromaticity coordinates of this new phosphor are such as to extend the total color range encompassed within the standard chromaticity triangle formed by connecting the primary NTSC blue, green, and red coordinates.

The present invention has as its primary object to provide a novel green luminescing phosphor composition for use in color television which will effect a further extension of the range of colors in the standard chromaticity diagram. This phosphor may be used in conjunction with the novel red luminescing phosphor referred to in the above-identified co-pending application or with conventional phosphors presently being employed.

More particularly, it is an object to provide a green luminescing phosphor composition and method for making the same which will provide a far superior luminescence both in brightness and linearity and particularly in the fidelity of the color green itself all to the end that an improved color television picture results.

Briefly, these and other objects and advantages of this invention are attained by the provision of a new phosphor composition in the form of magnesium spinel doped with divalent manganese ions. In addition, the composition includes an additive for quenching a long-lived luminescent component of the phosphor so that it is compatible for use with color television.

In the method for forming the phosphor composition, a mixture of various oxysalts of magnesium, aluminum, and manganese are gradually calcinated up to a temperature of approximately 1000° C. The resulting powder is then dropped through an inverted burner which is operated with a reducing composition; for example, oxy-gas or oxy-hydrogen. During the trajectory time of the powder through the burner, which is less than one second, the material is converted to the phosphor with an efficiency considerably higher than that attained by presently known methods. Further, because of the high specific surface diffusion, a fairly large portion of the manganese ions are received in the spinel lattice formation.

Figure 2:
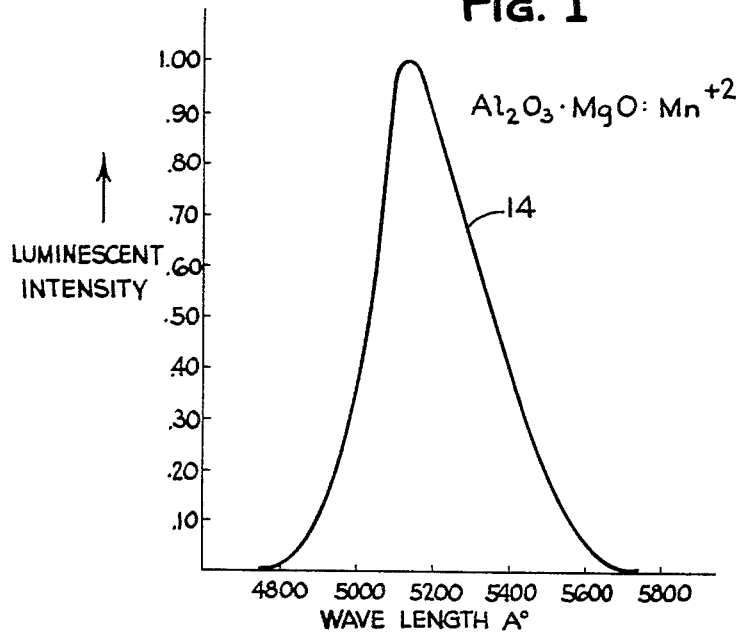

A better understanding of the invention will be had by now referring to the accompanying drawings, in which:

FIGURE 1 is a chromaticity coordinate system with diagrams useful in explaining various aspects of the invention; and FIGURE 2 is a plot of the luminescent intensity of the new green luminescent phosphor composition of this invention.

Referring first to FIGURE 1, there is illustrated the $xy$ coordinate axes for the standard chromaticity diagram to which the standard primary coordinates for blue, green, and red phosphors are referenced. The coordinate points are shown connected by solid straight lines to define a chromaticity triangle 10. Surrounding the triangle 10 is a closed curve 11 which represents the entire visible color spectrum.

It will be evident from FIGURE 1 that if the area of the triangle 10 can be increased to encompass more of the visible spectrum enclosed within the curve 11, the range of available colors for reproduction by the phosphors involved will be correspondingly increased.

In accordance with the new red luminescing phophor described and claimed in the heretofore referred to co-pending application, the chromaticity triangle 10 was increased as indicated by the dashed line 12 connecting the standard blue coordinate point with the new red luminescing phosphor coordinates.

$x=.674$
$y=.326$

The prior art sulfide type green phosphors have coordinates in the range of $x=.240$
$y=.590$ to $.610$ From these coordinates, it will be evident that the phosphors are yellow-green and not very saturated. In fact, they fail to meet the NTSC green standard coordinates of $x=.210$
$y=.710$ shown in FIGURE 1.

The new green luminescing phosphor provided by the present invention is far superior to the conventional green phosphors employed to date. This new phosphor comprises basically magnesium spinel doped with divalent manganese ions. Its composition is given by the formula $$MgO \cdot XAl_2O_3:Mn^{+2}$$

where X has a value from 1 to 5. The chromaticity coordinates for this phosphor are $$x = .127$$
$$y = .765$$

and are shown plotted in FIGURE 1 and connected to the standard blue coordinate points by the dashed line 13. It will be clear that when the new green luminescing phosphor is used with either conventional phosphors corresponding substantially to the standard red phosphor or to the improved red phosphor described in the referred to co-pending application, and the various coordinates connected as indicated by the dashed lines 12 and 13, the area of the chromaticity triangle 10 is greatly increased to encompass a greater range of colors within the gamut of the visible spectrum defined by the outline 11.

Referring to FIGURE 2, it will be noted that the luminescent intensity peaks at a wave length corresponding to an almost pure spectral green. This pure green is a consequence of the manganese ions within the magnesium spinel lattice. The appearance to the eye is clearly green and not yellow-green. As a consequence, a far greater fiidelity in color television reproduction when using this phosphor is realized.

We have been able to prove that the green luminescing species is divalent manganese by means of electron spin resonance. A higher valence of manganese, for example $Mn^{+4}$, yields an orange-red luminescence rather than green. The divalent maganese is a substitutional additive for magnesium in the spinel lattice. In the case of substitutional addition, there is generally guaranteed a high degree of linearity of luminescence with cathode ray intensity.

To insure the proper reception of the divalent manganese in the spinel lattice as opposed to higher valence manganese ions, a novel method of providing the green luminescent phosphor of this invention was necessary.

In accordance with known methods, doped spinel is obtained by calcination of a mixture of the various metal oxides, for example sulfates, nitrates, carbonates, etc. The oxysalt residue pyrolitically decomposes and yields the oxide as a residue. At this stage the valence of the additive is still beyond control. In the case of manganese doping, the valence is off from the +2 value, the predominating ions most likely having a valence of +4, and manganese ions are not truly incorporated in the spinel lattice.

Thus, when the foregoing material is heated in a reducing atomsphere, the equilibrium between the divalent manganese $Mn^{+2}$ and the quadravalent manganese $Mn^{+4}$ shifts in favor of $Mn^{+2}$. However, the crystal lattice of the spinel is so well formed that diffusion of the manganese additive is slow. It is believed that the high temperatures involve, approximately 1600° C. and higher, and the relatively long heating times required are a consequence of the initially well formed spinel lattice.

In accordance with the novel method of the present invention, and as a specific example of the various steps taken in the formation of the green luminescent phosphor of this invention, oxysalts of the magnesium, aluminum, and manganese having a given water content are mixed together. For example, these oxysalts may comprise $$MgSO_4 \cdot 7H_2O;\ NH_4Al(SO_4)_2 \cdot 12H_2O;\ \text{and}\ MnSO_4 \cdot H_2O$$

the manganese sulfate being added to provide an atom concentration of the manganese ions of from 0.1 to 10 percent.

In accord with the next step of the new method, the oxysalts are calcinated gradually up to a temperature of approximately 1000° C. During this heating, the material melts in its own water at about 100° C. and becomes homogenous. As the melt continues to be heated up towards 1000° C., the sulfur oxides break off and leave a loose combination of the oxides of magnesium, aluminum and manganese. At this point, however, there has not been formed the magnesium spinel. As a consequence there is no rigid constraint with respect to the manganese ions fitting into a spinel lattice.

After the gradual calcination, the resultant oxides are cooled down and are in the form of a fine powder. This powder has a high specific surface.

In accord with the next step, the powder is dropped through an inverted flame or torch; for example, a Verneuil torch, which is operated with a reducing composition such as an oxy-gas or oxy-hydrogen. By this step of the method, the powder is subjected to a much higher temperature for a far briefer time than is the case with prior methods. The reducing or oxidizing conditions are managed so that $Mn^{+2}$ is favored over $Mn^{+4}$. It is during the transition period of the powder through the inverted flame that the magnesium spinel is formed and the $Mn^{+2}$ ions received within the spinel lattice. Because of the high specific surface, diffusion is rapid and a large portion of the divalent manganese is involved in the spinel lattice formation. Thus, the material is converted to the phosphor with an efficiency higher than that attained by the prior methods outlined heretofore.

The resulting green luminescing phosphor is in the form of a powder which may then be provided with a suitable binder and incorporated in a color television tube.

The phosphor formed in accord with the foregoing method has, besides a 5.6 millisecond lifetime component of luminescence, a very long-lived luminescence which would render it incompatible with the requirements of color television. This problem, however, has been solved in accordance with a further feature of the composition and method of this invention by the use of an additive for quenching the long-lived luminescent component completely without deteriorating or modifying the short life component of 5.6 milliseconds. Oxysalts of vanadium and titanium have been used successfully for this purpose, the vanadium oxysalt evidencing a superior quality.

Accordingly, when the green phosphorescent composition is actually to be used in a color television tube, the phosphor composition includes the quenching additive. The atom concentration of the additive may vary from approximately .5 to 2 percent of the manganese ion concentration.

Thus, the preferred method for forming the green phosphor for use in color television includes the additional step of incorporating a quenching compound, and in the specific example outlined heretofore, a small quantity of vanadylsulfate is added to the original oxysalt mixture prior to calcination.

From the foregoing description of the phosphor composition and method of forming the same, and the resulting improved chromaticity coordinates for the phosphor as illustrated in FIGURE 1, it will be evident that the present invention has provided a vastly improved green luminescent phosphor suitable for replacing the conventional sulfide types of phosphors used for the green primary color in television tube manufacture. The result, as stated, is a colored television picture far superior to that realizable with present day phosphors.

What is claimed is:

1. A green luminescing phosphor defined by the chemical formula $MgO \cdot XAl_2O_3:Mn^{+2}$ where X has a value from 1 to 5, the atom concentration of manganese ions being from .01 to 10 percent; and an additive of vanadium in an atom concentration of from .5 to 2 percent of said manganese concentration.

2. A green luminescing phosphor composition for color television consisting essentialy of: magnesium aluminate spinel doped with divalent manganese ions in an atom concentration of from 0.1 to 10 percent, and an additive of vanadium in an atom concentration of from .5 to 2 percent of said manganese concentration for quenching the long-lived luminescent component of said phosphor.

3. A method of forming a green luminescing phosphor composition including magnesium aluminate spinel doped with divalent manganese ions and a quenching additive of vanadium, comprising the steps of: mixing oxysalts of aluminum, magnesium, and manganese; adding a metal ion quencher comprising vanadium to said crystals to provide an atom concentration of said metal ion quencer of from .5 to 2 percent of the manganese concentration; gradually calcinating the resulting mixture up to a temperature of approximately 1000° C. to provide an oxysalt residue in the form of a powder; and dropping the powder through an inverted burner operated with a reducing composition to form said magnesium aluminate spinel with divalent manganese received in the spinel lattice, said additive quenching the long-lived luminescent component of said phosphor.

References Cited
UNITED STATES PATENTS 2,116,167  5/1938  Espig _____ 252—301.4

OTHER REFERENCES

Hummel et al.: The Cathodoluminescence of $Mn^{+2}$ and $Fe^{+3}$ Activated Magnesium Aluminum Spinel, Journal of Electrochemical Society, vol. III, No. 2, February 1964, pp. 252–3.

TOBIAS E. LEVOW, *Primary Examiner.*

R. D. EDMONDS, *Assistant Examiner.*